United States Patent [19]

Stolz et al.

[11] Patent Number: 5,038,442
[45] Date of Patent: Aug. 13, 1991

[54] COUPLING DEVICE INCLUDING A HINGE PIN FOR INTERCONNECTING CONVEYOR BELT ENDS

[75] Inventors: Hermann Stolz, Muehlheim; Wolfgang Herold, Offenbach, both of Fed. Rep. of Germany

[73] Assignee: MATO Maschinen-und Metallwarenfabrik Curt Matthaei GmbH & Co. KG., Offenbach, Fed. Rep. of Germany

[21] Appl. No.: 514,677

[22] Filed: Apr. 25, 1990

[30] Foreign Application Priority Data

Apr. 27, 1989 [DE] Fed. Rep. of Germany ....... 3913943

[51] Int. Cl.5 .............................................. F16G 3/02
[52] U.S. Cl. ..................................... 24/33 P; 24/33 B
[58] Field of Search ................... 24/33 P, 33 R, 33 B, 24/33 C, 33 M

[56] References Cited

U.S. PATENT DOCUMENTS

| 92,354 | 6/1909 | Maxwell | 24/33 B |
| 430,668 | 6/1890 | Morrall | 24/33 C |
| 1,348,747 | 8/1920 | Schilling | 24/33 B |
| 1,444,301 | 2/1923 | Bukovecz | 24/33 M |
| 4,023,239 | 5/1977 | Stolz . | |
| 4,597,137 | 7/1986 | Droppleman et al. | 24/33 P |

FOREIGN PATENT DOCUMENTS

| 2706295 | 8/1978 | Fed. Rep. of Germany | 24/33 B |
| 677669 | 8/1952 | United Kingdom | 24/33 P |
| 2032872 | 5/1980 | United Kingdom . | |

Primary Examiner—Victor N. Sakran
Attorney, Agent, or Firm—W. G. Fasse

[57] ABSTRACT

A coupling device forming a hinge pin for interconnecting connector elements secured to conveyor belt ends, has a threaded end for facilitating the driving of the hinge pin into a channel formed by the connector elements when these connector elements intermesh. The threaded end of the hinge pin may be a deparate element that can be attached to a hinge pin in a remobable manner.

12 Claims, 2 Drawing Sheets

COUPLING DEVICE INCLUDING A HINGE PIN FOR INTERCONNECTING CONVEYOR BELT ENDS

FIELD OF THE INVENTION

The invention relates to a coupling device for interconnecting connector elements secured to conveyor belt ends.

BACKGROUND INFORMATION

Coupling devices including hinge pins of the above type are used conventionally for flexibly interconnecting conveyor belt ends by means of connector elements which intermesh to form a connector channel into which the coupling rod, also referred to as a hinge pin, is inserted. The hinging of the connector elements to each other permits the movement of the conveyor belt even around a driving wheel. The coupling rods are exposed to high loads during operation. For increasing the wear and tear resistance the connector rods are conventionally made of steel cable strands which are armored by a steel helix.

U.S. Pat. 4,023,239 (Stolz) discloses a coupling rod of the just mentioned type in which a flexible core is enclosed by a plurality of sleeves, each of which has curved end faces in contact with mating end faces of adjacent sleeves. Such conventional coupling rods have excellent wear and tear resistance. However, there is room for improving these rods with a view to facilitating their insertion into the channel formed by the eyelets of the connector elements when these connector elements intermesh.

OBJECTS OF THE INVENTION

In view of the foregoing it is the aim of the invention to achieve the following objects singly or in combination:

to reduce the time necessary for inserting such connector rods or hinge pins into their operating position by making it easier to drive these hinge pins into the channel;

to make it possible to insert these hinge pins by a threading operation; and to provide the hinge pins with a threaded inserting end that may be replaceable if the threading should be worn-out without replacing the entire hinge pin.

SUMMARY OF THE INVENTION

According to the invention coupling device of the above described type has a connector rod hinge pin equipped with a thread at its inserting end, for cooperation with the connector loops of the device, whereby the hinge pin is pulled into a connector channel formed by the connector elements. For this purpose the end opposite the inserting end of the hinge pin is formed as a driving end is provided with means for rotating the hinge pin, whereby the threading cooperating with the connector loops pulls the pin into the connector channel. Thus, the thread at the inserting end serves as a pulling element for the coupling rod or hinge pin when the latter is rotated during the insertion. Such rotation may be performed by a handcrank or with the aid of an electrically or pneumatically driven tool. The threading preferably has a pitch corresponding to one half the width of the individual coupling elements. This width is measured in the axial direction of the coupling rod. The feature of correlating the pitch of the thread with one half the width of the coupling elements has the advantage that the thread turns can bear against the edges of the coupling elements, or rather the eye portion of the coupling elements.

Preferably, the thread is a wire that is helically wound around the inserting end of the coupling rod. The wire is then secured to the outer surface of the inserting end, for example, by soldering, brazing, or welding. Further, the inserting rod end, or rather the threaded end, has a conical shape, for example, the shape of a frustum. Preferably, the thread forming helical wire is not secured along its entire length so that a wire end facing the rod remains free to be bent away from the rod after the insertion has been completed. This feature has the advantage that when the free wire end is bent away from the coupling rod the free wire end forms a safety because the free wire end bears against the side of the neighboring connector elements, thereby securing or fixing the coupling rod in its fully inserted position against withdrawal at least in one direction.

In another embodiment, the threaded inserting end may be a separate element securable in a releasable manner to the coupling rod so that the threaded end is easily replaced when the threading is worn out without the need for replacing the entire coupling rod. It may also be convenient to remove the separate threaded element after insertion is completed.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
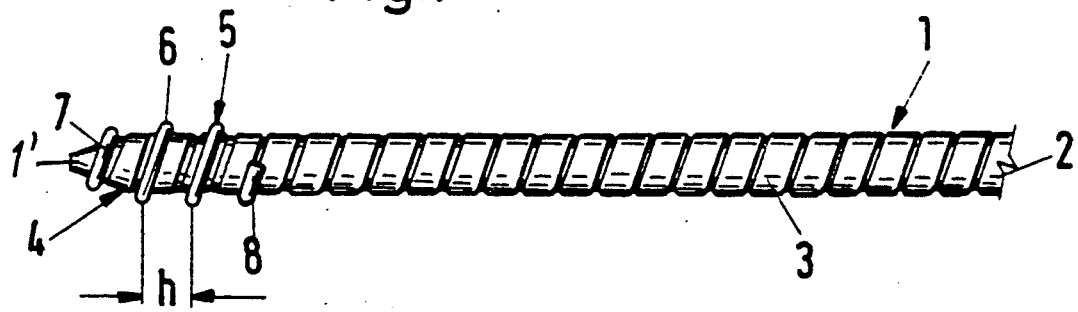
FIG. 1 is a side view of a coupling rod or hinge pin according to the invention.
Figure 4:
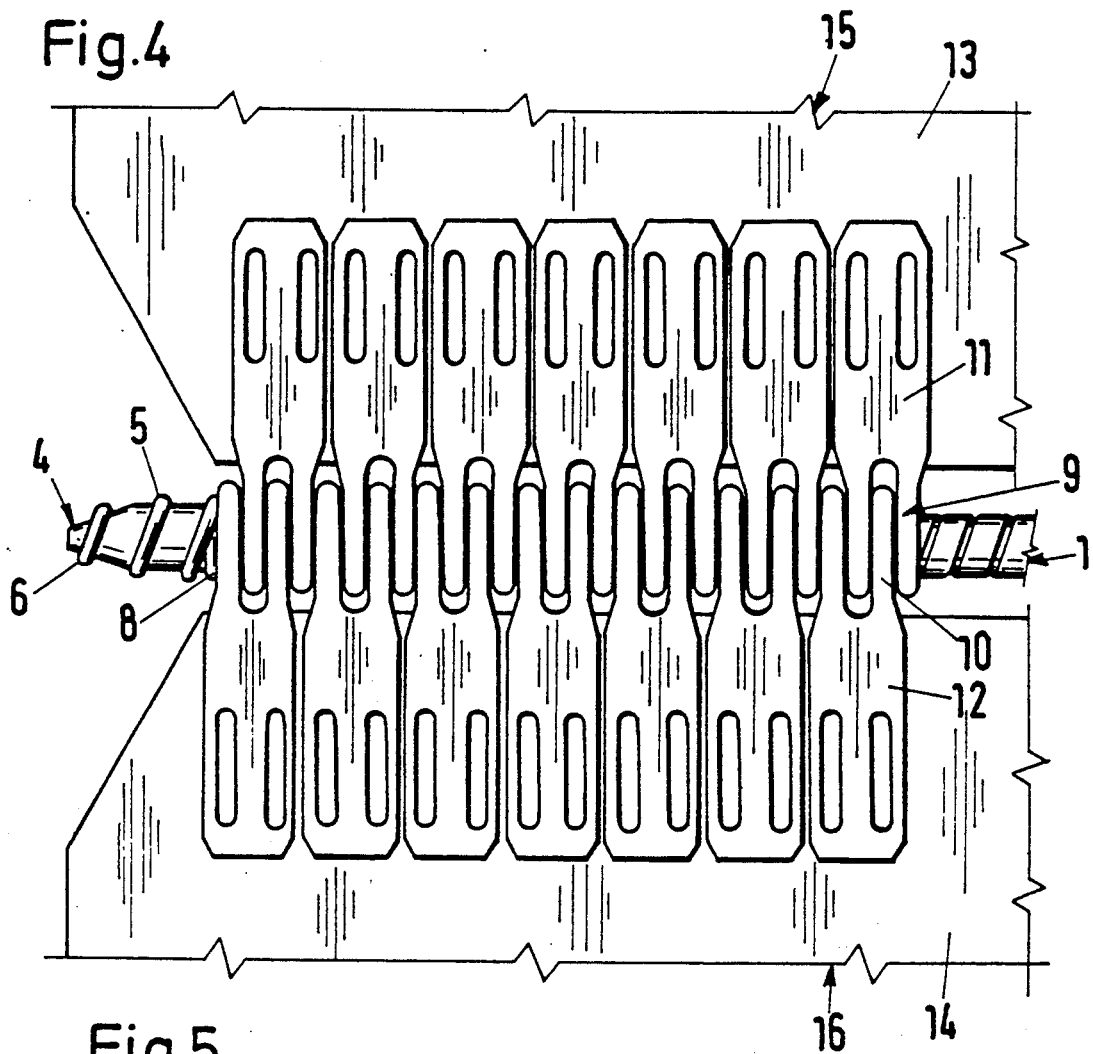
FIG. 4 is a top plan view of two interconnected conveyor belt ends illustrating the fully inserted coupling rod.

FIG. 1 shows a coupling rod or hinge pin 1 according to the invention comprising a plurality of steel wire strands 2 encased by a steel helix 3 as is conventional. The rod 1 has an inserting end 4 with a conical, for example, frustum shaped tip 1'. A thread 5 having a few thread turns 6 is secured to the inserting end 4 of the rod 1. The outer thread turn 7 of the thread 5 is wound around the conical tip 1' so that the thread turn 7 also is conical. The turns 6 of the thread 5 are preferably made of wire, such as steel wire, that is soldered, brazed, or welded to the steel helix or casing 3. The thread 5 has an inner wire end 8 that is preferably not soldered to the casing or helix 3. Thus, the free end 8 may be bent outwardly after the coupling rod has been fully inserted to thereby arrest the coupling rod against unintended withdrawal as shown in FIG. 4, in one direction.

Figure 2:
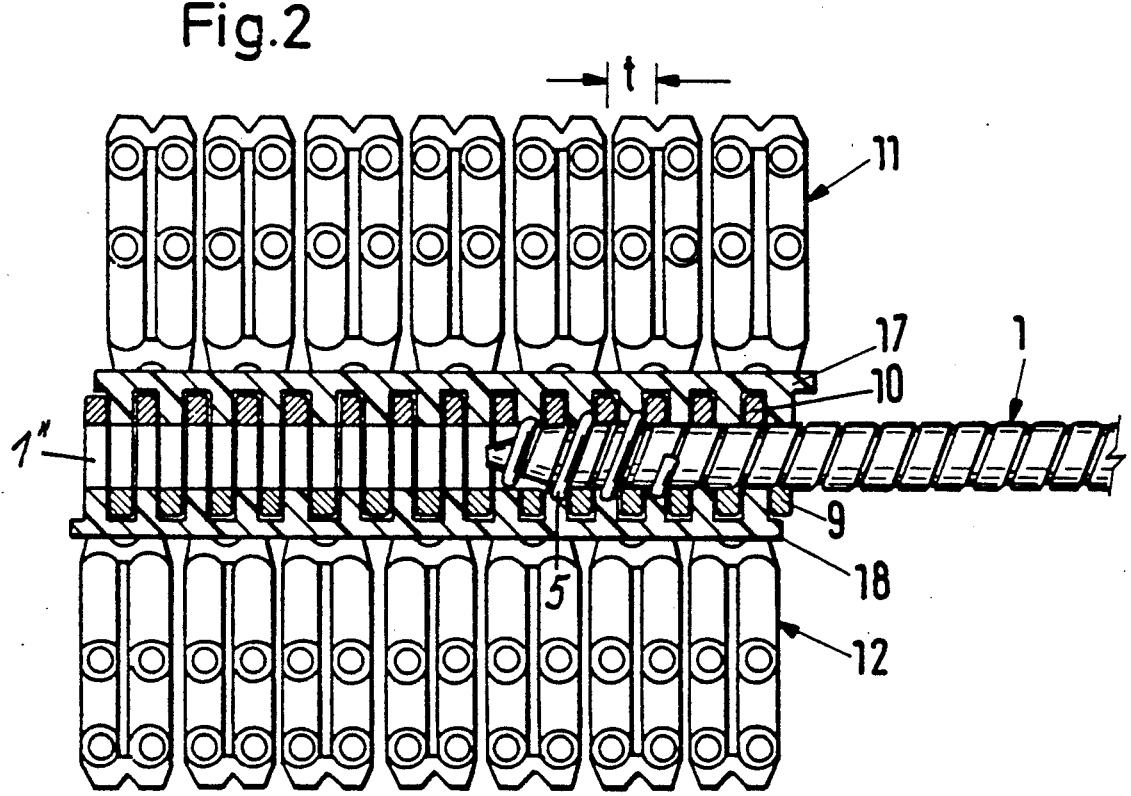
FIG. 2 is a top plan view shown partially in section, in the area of the coupling eyes or loops of the belt coupling elements intermeshing with each other, and illustrating a coupling rod partially inserted into a connector channel formed by the coupling loops or eyes.

The threading has a pitch h that is preferably selected to correspond to the eye spacing t of the eyes or loops formed by the connector elements 11, 12 shown in FIG. 2. This eye spacing corresponds approximately to one half the width of the coupling elements 11 and 12.

FIG. 2 illustrates the insertion of the coupling rod 1 as it is being screwed into the connector channel formed by the loops or eyes 9 and 10 of the coupling elements 11 and 12. As the rod 1 is rotated at its driving end, the wire formed thread bears against the edges of the loops, thereby facilitating the pulling of the rod 1 into the channel 1". As shown in FIG. 2, a filler body 17, 18 may be inserted into the free space between the coupling loops or eyes 9 and 10 of the coupling elements 11, 12. Normally, these filler bodies 17, 18 reach to the ends of the belts 13, 14 shown in FIG. 4. The filler bodies have the advantage of protecting the connector loops. However, such filler bodies make it more difficult to insert the coupling rod. The present threading avoids this problem. As shown in FIG. 2 the thread 5 pulls the coupling rod with certainty through all the connecting elements 11, 12 by bearing against the coupling eyes or loops 9, 10 when the rod 1 is rotated.

Figure 3:
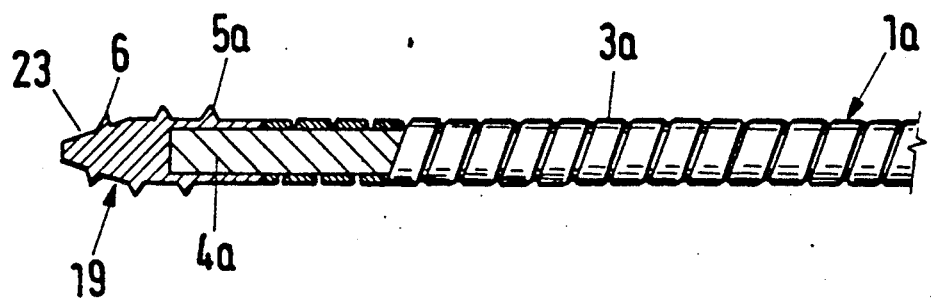
FIG. 3 is a view similar to that of FIG. 1, but showing a modified construction.

FIG. 3 illustrates an embodiment in which the rod 1a is again armored with a steel helix 3a. However, the thread 5a with its turns 6 is an integral part of a separate element 19 also having a conical tip 23 and carrying the turns 6 of the thread 5a as an integral component of the separate element or end piece 19. The tip 23 including the thread is conical toward the outer free end to facilitate the initial insertion into the channel. The end piece 19 is secured to the insertion end 4a of the rod 1a, for example, by soldering, brazing, or welding. The outer diameter of the thread 5a, and also of the thread 5, is such that it is slightly larger than the outer diameter of the reinforcing helix 3a.

As mentioned above, FIG. 4 shows conveyor belt portions 15 and 16 which may be part of the same belt section or of different belt sections, and forming end edges 13 and 14 interconnected by the rod 1 as shown. The rod 1 is fully inserted and the free wire end 8 is bent radially outwardly to prevent the withdrawal of the rod 1 in a direction from left to right in FIG. 4.

Figure 5:
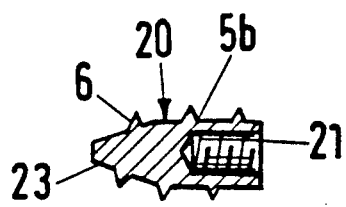
FIG. 5 shows a threaded end element that can be releasably secured to the inserting end of the coupling rod.

FIG. 5 shows another modification in which a separate threaded element 20 is provided with the thread 5b, and with a bore provided with an inner threading 21. The outer tip 23 is again conical or has the shape of a frustum.

Figure 6:
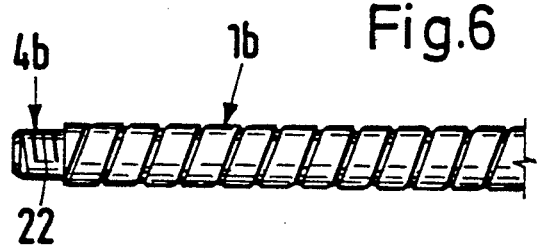
FIG. 6 shows a coupling rod provided with an outer threading fitting into an inner threading of the separate threaded element of FIG. 5.
Figure 7:
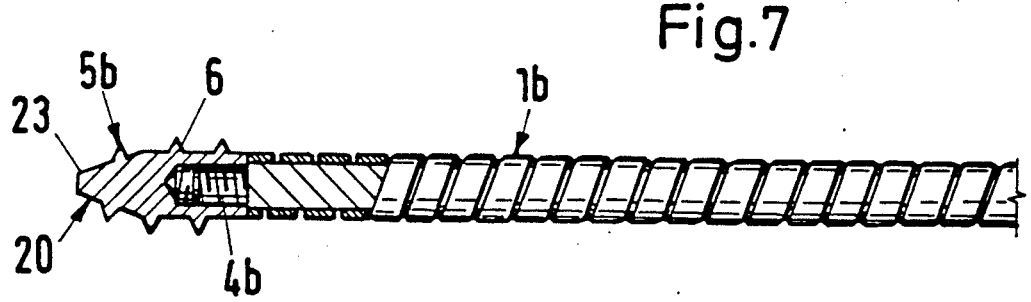
FIG. 7 shows the coupling rod of FIG. 6 combined with the separate threaded element of FIG. 5, partially in section.

FIG. 6 shows a connector rod 1b having an insertion end 4b provided with an external threading 22 for cooperation with the internal threading 21 of the separate element 20, which thus may be secured to the rod 1b in a releasable manner. Any conventional means may be used for securing the separate element 20 to the insertion rod end 4b in a releasable manner.

The embodiment of FIGS. 5 and 6 has the advantage that the separate element 20 can be removed after the insertion of the rod 1b into the coupling channel. For this purpose it may be sufficient if the end 4b of the rod 1b is provided with a square end fitting into a square hole in the separate element 20.

As mentioned, in all embodiments, the thread turns 6 have an outer diameter projecting outside the outer diameter of the rod with its armor. The threading also projects outside the contour of the separate end elements or pieces 19, 20. Further, it has been found that the thread 5, 5a, 5b can be relatively short so that a few thread turns are sufficient for the intended purpose of pulling the coupling rod into the coupling channel. The thread pitch is such that the thread lead is relatively steep and a thread pitch h = t as shown in FIG. 2 has been found to be satisfactory.

Although the invention has been described with reference to specific example embodiments, it will be appreciated that it is intended to cover all modifications and equivalents within the scope of the appended claims.

What we claim is:

1. A coupling device for interconnecting belt ends to each other, comprising connector elements having connector loops and connector ends secured to a respective belt end, said loops being spaced to mesh with each other when the belt ends are brought together, said connector loops forming a connector channel, a hinge pin having an inserting end and a driving end, said inserting end having thread means for cooperation with said connector loops to pull said hinge pin into said connector channel when said driving end of said hinge pin is rotated with the threaded end inserted into said connector channel.

2. The coupling device of claim 1, wherein said inserting end of said hinge pin and said thread means have a conical configuration at least along an end portion of said thread means.

3. The coupling device of claim 1, wherein said thread means comprise a helically wound wire soldered, or brazed, or welded to said inserting end of said hinge pin for forming a thread.

4. The coupling device of claim 3, wherein said helically wound wire comprises a free wire end away from a pin tip of said inserting end, said free wire end being unconnected to said hinge pin, for providing a safety against withdrawal of said hinge pin by bending said free wire end away from said hinge pin after the hinge pin has been fully inserted into said connector channel.

5. The coupling device of claim 1, wherein said thread means have a thread pitch corresponding substantially to one half the width of said connector elements, said width being measured in the direction of the length of said hinge pin.

6. The coupling device of claim 1, wherein said thread means project radially outwardly of a periphery or diameter of said inserting end of said hinge pin.

7. The coupling device of claim 1, wherein said inserting end of said hinge pin is a separate element securable to said hinge pin, said thread means being part of said separate element.

8. The coupling device of claim 7, wherein said separate element comprises said thread means on its outer surface and a threaded bore inside said separate element, said hinge pin having an end threading fitting into said threaded bore of said separate element for removably securing said separate element to said hinge pin.

9. The coupling device of claim 7, wherein said thread means of said separate element project radially outwardly of a periphery or diameter of said separate element which is securable to said hinge pin.

10. The coupling device of claim 7, wherein said separate element has a conical configuration at least along a portion of said separate element.

11. The coupling device of claim 7, wherein said thread means on said separate element comprise a helically wound wire soldered, or brazed, or welded to said separate element.

12. The coupling device of claim 11, wherein said helically wound wire comprises a free wire end next to said hinge pin for providing a safety against withdrawal of said hinge pin from said connector channel.

* * * * *

UNITED STATES PATENT AND TRADEMARK OFFICE
CERTIFICATE OF CORRECTION

PATENT NO. : 5,038,442
DATED : August 13, 1991
INVENTOR(S) : Hermann Stolz et al.

It is certified that error appears in the above-identified patent and that said Letters Patent is hereby corrected as shown below:

On the Title page

In the Abstract [57], line 6, replace "deparate" by
--separate--;
line 7, replace "remobable" by
--removable--.

Signed and Sealed this

Twenty-ninth Day of December, 1992

Attest:

DOUGLAS B. COMER

Attesting Officer    Acting Commissioner of Patents and Trademarks